United States Patent
Ton et al.

(10) Patent No.: US 8,943,173 B1
(45) Date of Patent: *Jan. 27, 2015

(54) SYSTEM AND METHOD FOR USING A COMPUTER AS A BRIDGE FOR DATA SYNCHRONIZATION BETWEEN A CELLULAR DEVICE AND A COMPUTER NETWORK

(71) Applicant: Amdocs Software Systems Limited, Dublin (IE)

(72) Inventors: Rafael Ton, Yokneam (IL); Yoad Gidron, Ramot Menashe (IL)

(73) Assignee: Amdocs Software Systems Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 14/447,504

(22) Filed: Jul. 30, 2014

Related U.S. Application Data

(63) Continuation of application No. 12/561,405, filed on Sep. 17, 2009, now Pat. No. 8,825,034.

(60) Provisional application No. 61/136,583, filed on Sep. 17, 2008.

(51) Int. Cl.
G06F 15/16 (2006.01)
H04B 7/14 (2006.01)
H04W 12/06 (2009.01)
H04W 4/00 (2009.01)

(52) U.S. Cl.
CPC .............. *H04W 12/06* (2013.01); *H04W 4/008* (2013.01)
USPC .......................................... 709/219; 455/419

(58) Field of Classification Search
CPC ..... H04W 12/00; H04W 12/06; H04W 12/08; H04W 12/10; H04W 92/10
USPC .......................................... 709/219; 455/419
See application file for complete search history.

(56) References Cited

U.S. PATENT DOCUMENTS 7,636,586 B2 * 12/2009 Maaniitty ..................... 455/557
2009/0036111 A1 * 2/2009 Danford et al. ............... 455/419

* cited by examiner

*Primary Examiner* — Asghar Bilgrami
(74) *Attorney, Agent, or Firm* — Zilka-Kotab, PC

(57) ABSTRACT

A method for data bridging and synchronization between a mobile device and a computer network, using a computer connected to the mobile device over a short range communication channel.

20 Claims, 10 Drawing Sheets

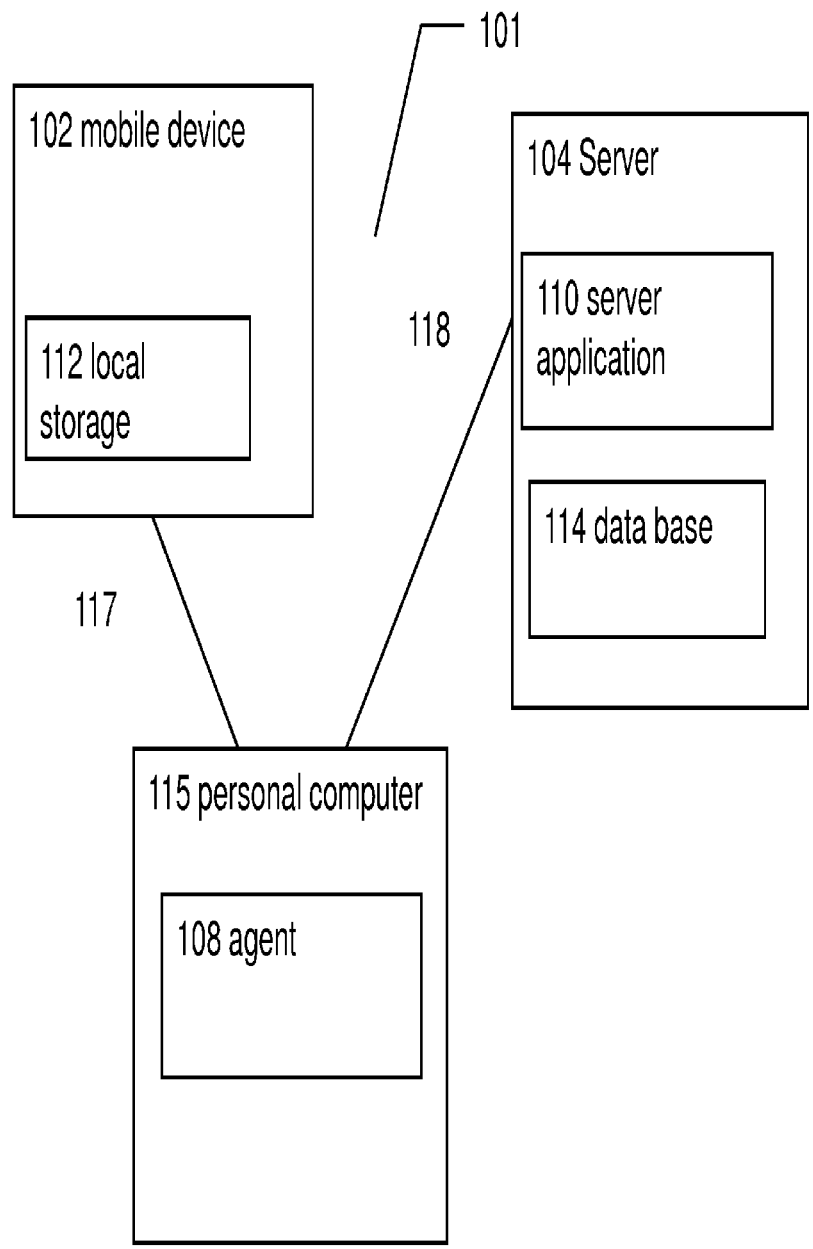

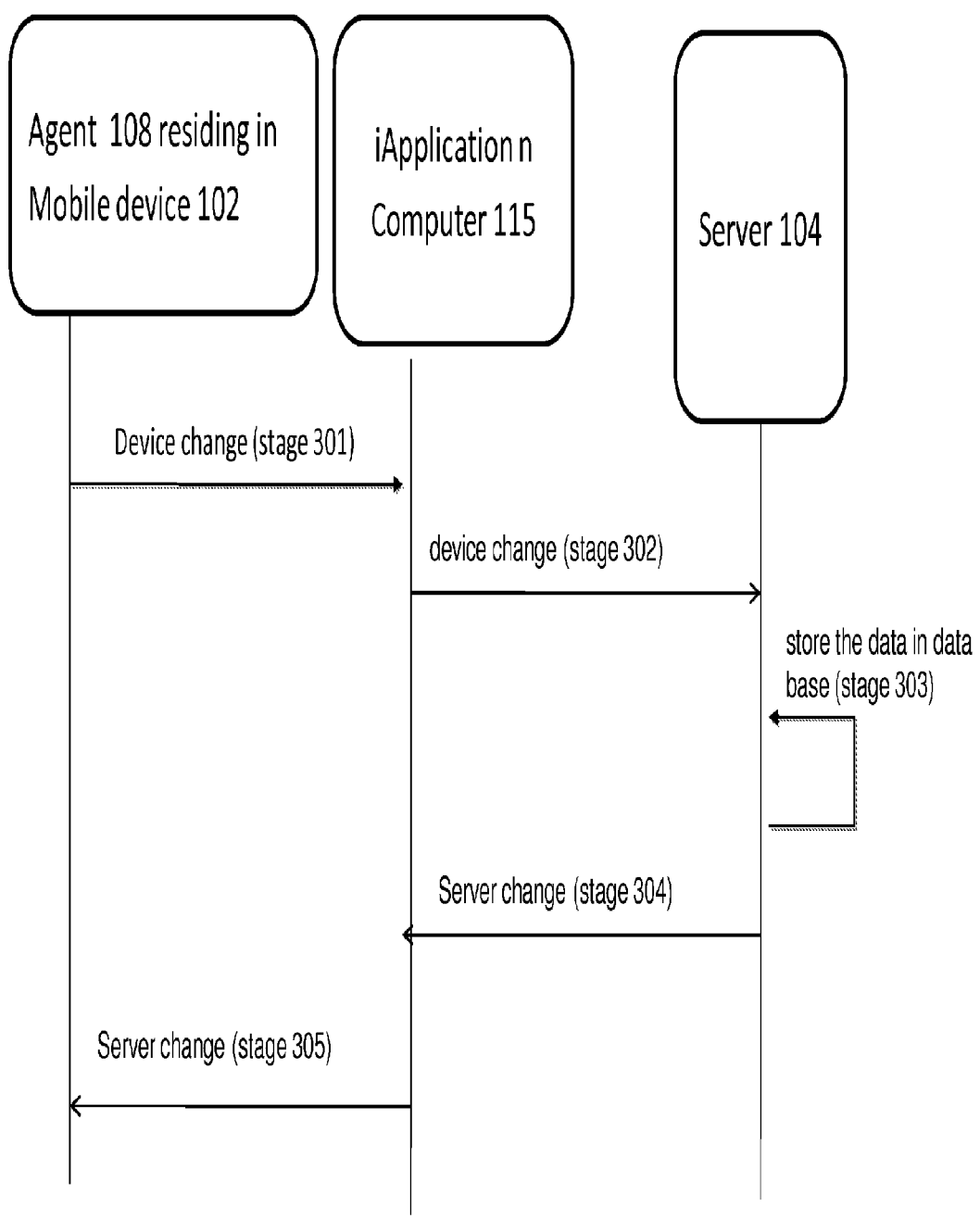

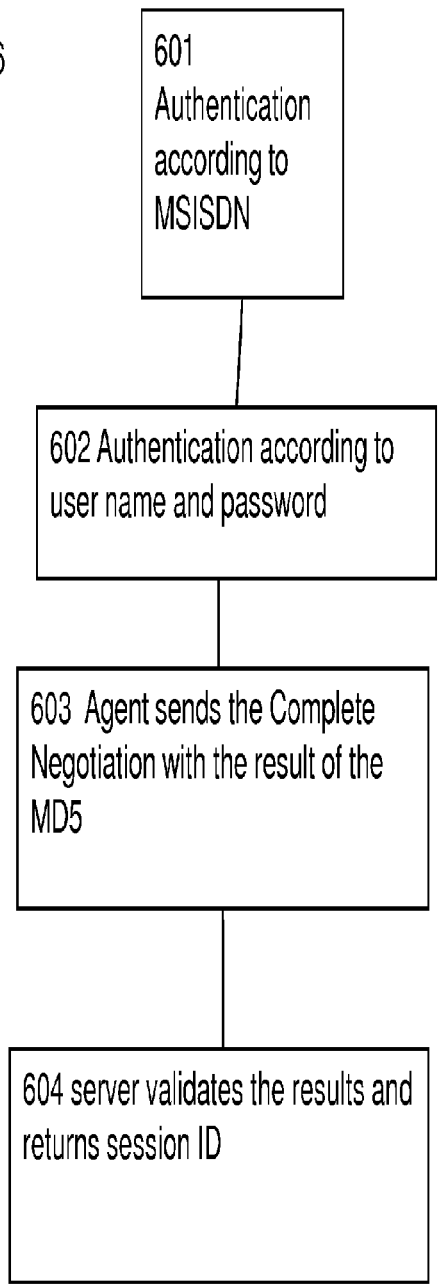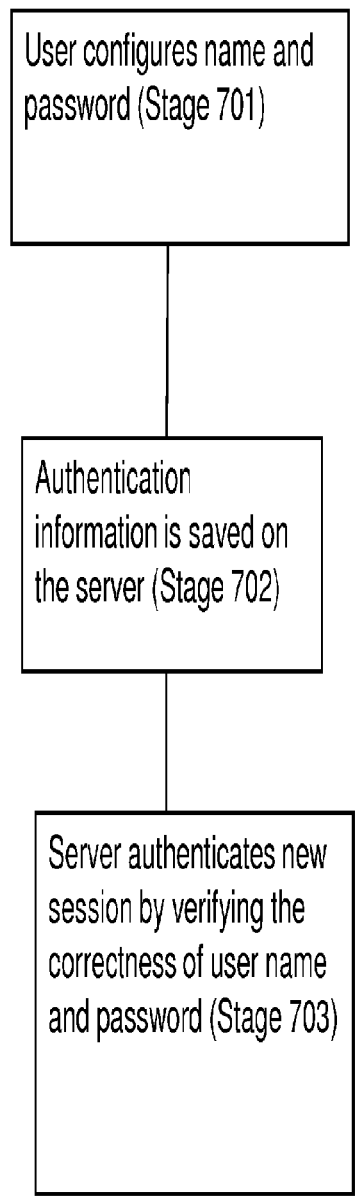

SYSTEM AND METHOD FOR USING A COMPUTER AS A BRIDGE FOR DATA SYNCHRONIZATION BETWEEN A CELLULAR DEVICE AND A COMPUTER NETWORK

This application is a continuation of U.S. application Ser. No. 12/561,405, filed Sep. 17, 2009, which claims priority from U.S. Provisional Application No. 61/136,583, filed on Sep. 17, 2008, which are hereby incorporated by reference in their entirety as if fully set forth herein.

FIELD OF THE INVENTION

The present invention is of a system and method for synchronization between a cellular device and a computer network, using a computer as a bridge.

BACKGROUND OF THE INVENTION

Digitally enabled telephones and other connected devices, including cellular telephones, are all able to be connected to a data network. Unlike simple analog telephones, this ability to communicate with a server increases the variety and type of services which may be offered through such telephones.

Short range wireless communication protocols, such as Bluetooth and infrared (IR) are now available in most of the cellular phones and enable wireless communication, short range communication between a mobile devices such as cellular telephone and a computer (PC) for various purposes such as, for example transferring files and the like.

The computer, with which the cellular telephone is communicating, is usually connected to the internet through a wired or a wireless communication, providing for long range communication. New cellular technologies such as the third generation cellular technology enable users to upload or download data from a cellular device to a server connected to the internet via cellular network. Such uploading and downloading can be used, for example for synchronizing data residing in the mobile device such as cellular telephone, for example calendar information with an external server connected to the internet network. Such data transfer may be utilized for many purposes for example for uploading pictures to internet applications such as Flickr, Picasa, Facebook (social networks) or the like.

However the use of cellular internet technology for data transmission posses a problem in that it is expensive, not reliable and may cause a heavy traffic on the cellular network itself. In addition such technologies have bandwidth limitation which makes the downloading and especially uploading inconvenient.

Unfortunately, there is no such solution which facilitates the potential in connecting a cellular device to the internet via a computer. Such connection can allow users to easily transfer data between their cellular device and the internet "cloud", without worrying about the cost of using the cellular network. Such connection can also improve the bandwidth and in particular when uploading data. Such connection can also enable user to transmit or receive data even when there is not connected to the cellular network or when the feature for connecting to the internet via cellular network is not available.

SUMMARY OF THE INVENTION

There is thus an unmet need for, and it would be highly useful to have a reliable and inexpensive method and system for transferring data between a mobile device such as a cellular telephone, and a server connected to the internet or other computer network. There is also an unmet need that provides users with higher bandwidth for downloading and, in particular, for uploading data. It is known in the art that upload links for cellular telephones have much lower bandwidth than download links.

There is also an unmet need, and it would be highly useful to enable mobile device users that are not connected to a cellular data network (temporarily or permanently), to be connected to internet or other computer network servers for transferring and receiving data.

The present invention overcomes the deficiencies of the background art by providing system and method for data synchronization between a mobile device, for example a cellular telephone, or mobile telephone, and a computer network through a computer, bridging between the cellular device and the Internet.

Before turning to a description of the present invention, a list of abbreviations is provided:

ABBREVIATIONS

CDMA, Code Division Multiple Access
ESN, Electronic Serial Number
HTTP, HyperText Transfer Protocol
HTTPS, HTTP Secure
IMEI, International Mobile Equipment Identity
MMS, Multimedia Messaging Service
MSISDN, Mobile Subscriber ISDN Number
PC, Personal Computer
SIM, Subscriber Identity Module
SIP, Session Initiation Protocol
SMS, Short Message Service
SyncML, Synchronization Markup Language
UI, User Interface Within the context of this application the term agent refers to software and/or firmware application for facilitating and/or controlling data communication for example synchronization between a device and a server. Data communication may optionally be provided with wireless communication, cellular, WiFi, BlueTooth, IR, wired, or the like. An agent is described in U.S. Patent publication U.S. 2009/0177800 which is incorporated herein by reference as if fully set forth.

Within the context of this application the terms "data push" or "push" refers to data that is being transferred between a sender and receiver where the data transfer process is controlled by the sender.

Within the context of this application the term "data pull" or "pull" refers to data that is being transferred between a sender and receiver where the data transfer process is controlled by the receiver.

Within the context of this application the term mobile device may bet interchangeably used with the term cellular device to refer to any mobile device that may be linked to a cellular network, for example a cellular telephone, PDA, Portable Media Player (PMP), netbook, laptop computer or the like mobile device.

Within the context of this application the term server refers to any content provider server, for example a third generation mobile telephone service provider. According to an optional embodiment, the present invention is simple to install, configure and use, and enables to download and upload data to a server connected to a computer network such as the internet, for purposes such as backup information residing in the cellular device, or for transferring data to/from internet applications. Such applications can be, for example Google (contacts and calendar) YouTube (video uploading and sharing), Facebook (social networks) and the like. Such data can be, for example, pictures and the like. The present invention enables access to server located on the computer network regardless of its location. The present invention relates to any type of computer network but is described herein with regard to the Internet for the purpose of description only and without any intention of being limiting in any way.

According to one embodiment of the present invention, the data is transferred from the cellular device to the computer via wireless or wired short range connections, also known as Personal Area. Network (PAN). Such wireless connections can be, for example Bluetooth, Infrared, UWB, Z-Wave, Zig-Bee and the like. Wired connection can be, for example USB cable, FireWire and the like. The protocol for transferring the data can optionally be a proprietary protocol or OBEX (Object exchange). OBEX (abbreviation of OBject EXchange, also termed IrOBEX) is a communications protocol that facilitates the exchange of binary objects between devices. It is maintained by the Infrared Data Association but has also been adopted by the Bluetooth Special Interest Group and the Data Synchronization protocol (SyncML) of the Open Mobile Alliance (OMA).The proprietary protocol, according to the invention, includes a flexible and fault-tolerant mechanism of splitting large amount of data (textual or binary) into multiple chunks, thus dealing with memory and networking constraints of each device.

The data from the computer to the server is transferred via protocols such as HTTP and the like. The application resides on the computer optionally and preferably is able to bridge (i.e. translate) between protocols and transfer the data from the cellular device to the server and vice versa.

According to other embodiment of the present invention, the data transferred from the cellular device to the computer can be either pushed or pull. If pull, then the cellular device might not have an agent, since the built-in Bluetooth capabilities of the phone can be used. If pushed, then the agent in the cellular device periodically, or upon request, transfers the data to from the cellular device to the computer. Pulling the data by the computer can optionally enable the accessing to specific data such as message inbox or file system (e.g., Bluetooth FTP profile), which may not reachable by the agent which is installed on the cellular device.

According to another embodiment of the present innovation, the server can communicate with one or more computers for transmitting/receiving data from cellular devices. The cellular device can optionally and additionally communicate directly with the server (in the case that the cellular device is not connected to a computer).

According to another embodiment of the present innovation, the server can store data received from cellular device, for back-up purposes, for example. Such data can be, for example personal address book, calendar and the like.

According to another embodiment of the present innovation, the server can communicate with other (third party) servers connected to the internet for transferring data received from the cellular devices. Such servers can be, for example, media sharing and social networking services, such as for YouTube or Facebook.

According to another embodiment of the present invention, the user can define the connection type to the Computer (Bluetooth, infrared and the like). The user can optionally define whether the data will be pushed to the computer or pulled (in the latter case an agent is not required to be installed in the cellular device. The user can also schedule the time for pushing or pulling the data or, additionally or alternatively download or upload the data on demand. The user can also optionally define the type of data that should automatically be transferred and the destinations.

The cellular device, according to this invention, can be any device with an access to a cellular network. Such device can be for example a, a cellular telephone, a PDA and the like. The cellular device is optionally and preferably capable of one or more of voice and/or video communication, messaging (more preferably one or more of SMS, MMS or EMS) or the like; for example the communication device is optionally a cellular telephone, or PDA. The cellular telephone preferably is able to communicate with a computer through a wire or wireless short range communication channel; such wireless communication can use, for example, Bluetooth, infrared, USB cable and the like. The cellular device preferably contains some kind of local storage, including but not limited to a flash memory, memory card, SIM card or a hard disk. Optionally and preferably the device is capable of voice and/or video communication.

The cellular telephone may also optionally be characterized as a limited resource device. Hereinafter, the term "limited-resource device" refers to a computational device in which computational resources such as memory, storage space, network bandwidth and/or data processing capabilities are limited, particularly in comparison to desktop computers such as PCs (personal computers), for example.

By "computer" it meant any computer which has short range communication capabilities, such as Bluetooth and /or infrared access and also has an access to the internet or other computer network.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

A cellular device as term herein may be any device that can transfer data through the cellular network or through a wired connection, as well as through a short range wireless connection such as Bluetooth or infrared, or through a direct wired connection to a local device or computer.

Although the present invention is described with regard to a "device" on a "wireless network", featuring a "server" and preferably for cellular communication, it should be noted that optionally any device featuring a data processor and/or the ability to execute one or more instructions with the ability to support at least voice communication may be described as a telephone, including but not limited to any type of telephone enabled computer, a cellular telephone, an IP telephone (software (virtual) device or real (hardware) device), a smart phone, a PDA (personal digital assistant), or a pager. Any two or more of such devices in communication with each other, and/or any computer in communication with a telephone may optionally comprise a "wireless network", which may (for example) optionally be a computer network and/or a cellular network.

A "server" as termed herein may optionally comprise any computer that is connected to an IP network. It should be noted that optionally any device featuring a data processor and/or the ability to execute one or more instructions may be described as a computer, including but not limited to a PC (personal computer), a server, a minicomputer. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1B is a schematic block diagram of an exemplary system according to the present invention without an agent on the cellular device.

FIG. 3A is a schematic diagram describing the push scenario in online mode.

FIG.6 is a detailed description of the proxy authentication process.

FIG.7 is a detailed description of the PC to server authentication.

DESCRIPTION OF THE PREFERRED EMBODIMENTS

The present invention is of a system and method for data bridging and synchronization between a mobile device and a computer network. For example and without wishing to be limited or to imply a closed list, for a cellular telephone or other device that communicates through a cellular network, the many advantages include but are not limited to lower cost, and increased bandwidth and reliability. For devices that use WiFi or WiMax, or other similar wireless but non-cellular communication protocols, the many advantages include but are not limited to availability since the network coverage is limited, and also to at least some extent increased bandwidth and reliability. For other types of wireless communication protocols, the many advantages may include but are not limited to any of the above, as well as any other advantages that accrue from use of bridging as described herein.

Common Terms

Mobile device 102
Server 104
Agent 108
Mobile device memory 112
Server memory 114
Computer 115

Figure 1A:
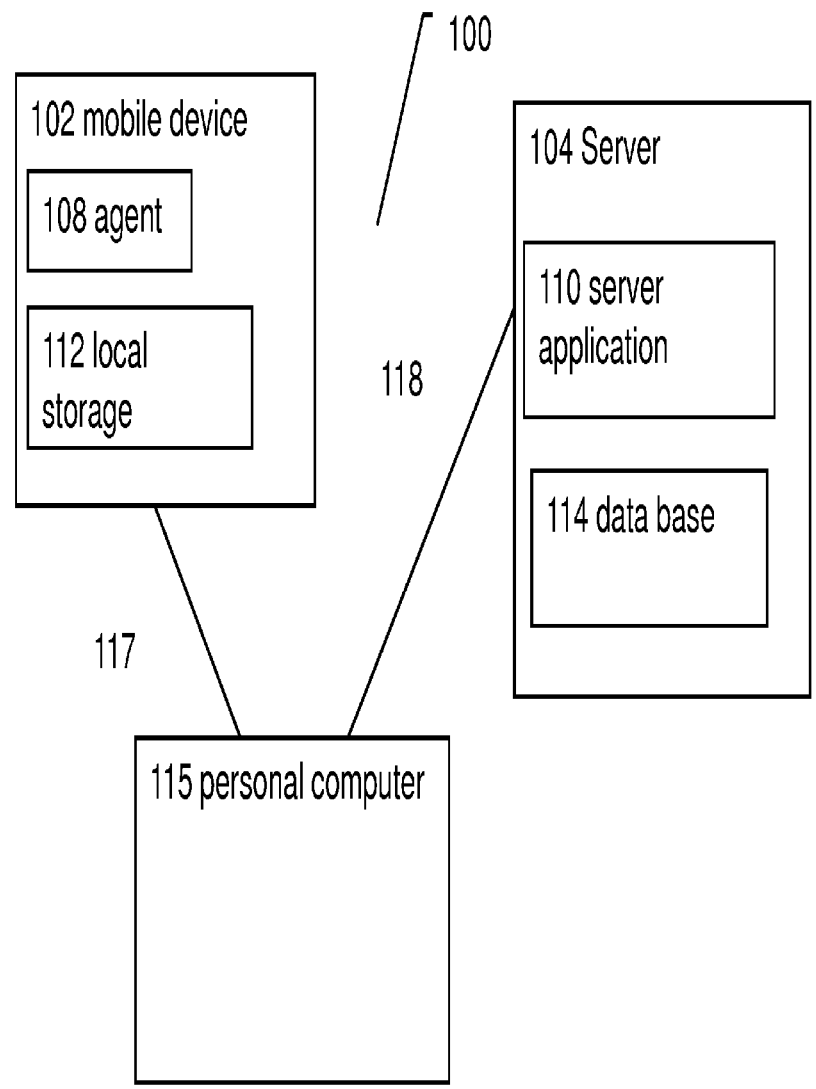
FIG. 1A is a schematic block diagram of an exemplary system according to the present invention comprising an agent installed in the cellular device.

Referring now to the drawings, FIGS. 1A-B show schematic block diagrams of an optional systems 100 (FIG. 1A) and 101 (FIG. 1B), according to a first, second and third embodiments of the present invention providing for data bridging and synchronization between a network server 104 and a mobile device 102 optionally and preferably by computer 115.

Most preferably data bridging and synchronization in systems 100 and 101 according to optional embodiments of the present invention is provided by an agent 108 optionally provided as a thin client or the like as is know in the art.

Agent 108 may be activated to facilitate communication between mobile device 102 and server 104 through a bridge most preferably provided by computer 115 by at least one or more modes of activation for example including but not limited to remote activation, automatic activation, manual activation, taken alone or in any combination thereof. Optionally two or more activation modes may be utilized essentially simultaneously to activate agent 108.

Optionally remote activation of agent 108 is optionally initiated by at least one or more of server 104, mobile device 102 or computer 115 that is not physically associated with agent 108. For example, as depicted in FIG. 1A agent 108 is associated with mobile device 102 wherein remote activated may optionally be provided by at least one of or both server 104 and/or computer 115. Most preferably, remote activation may be provided by server 104. For example, server 104 may optionally initiate such agent 108 activation through a Communication Initiation Request (CIR) or through like protocols. For example a CIR is sent by server 104 to activate agent 108.

Optionally automatic activation of agent 108 may be initiated by a triggered event and/or occurrence taking place in at least one or more of mobile device 102, server 104 or computer 115. Optionally a triggered event may for example include but is not limited to a time dependent event, time lapse, scheduled event, missed event, milestone crossing, hardware event, hardware coupling, software event, software coupling, wireless device coupling, system event, processor reboot, user iteration, sending and/or receiving a trigger, SMS, automatic voice activation, geographical displacement, roaming event, association with an auxiliary device, association with a device, a sensed event or the like triggering event taken alone or in any combination thereof.

Optionally manual activation may be initiated by at least one or more user, optionally by interacting with hardware and/or software associated with at least one of mobile device 102, server 104 and/or computer 115 that is associated with agent 108. Most preferably manual initiation is triggered by a user interacting with mobile device 102 comprising agent 108. For example, a user may manually activate agent 108 through an available menu option associated with device 102.

Optionally and preferably following activation agent 108 functions to facilitate data bridging and synchronization between at least two data stores associated with at least two devices for example including but not limited to mobile devices 102, server 104 and/or computer 115. Most preferably data is bridged between mobile device 102 and server through computer 115. Agent 108 may optionally provide data synchronization for a plurality of data types common to at least two devices for example including but not limited to mobile device 102, computer 115 and server 104. Synchronized data may for example include but is not limited to contact information, address book data, calendar events (including but not limited to meetings, anniversaries, birthdays, holidays, appointments, reminders, etc.), tasks (i.e. "to do"), messages, SMS, media files, image data, audio data, video data or the like, documents and/or other files.

Most preferably a communication bridge is established between server 104 and device 102 via a communication bridge comprising at least one communication channel and more preferably at least two communication channels. A first communication channel 117 is preferably established between mobile device 102 and computer 115. Optionally first communication channel 117 is most preferably provided in the form of a local peer-to-peer connection providing for local and/or short range communication between device 102 and computer 115, for example including but not limited to short range communication technology, short range communication protocols such as wired, Bluetooth, IR, optical, acoustic or the like short range communication technology and/or protocols as is known in the art.

Preferably and optionally, a second communication channel 118 is preferably provided to establish communication between computer 115 and server 104 for example including wired, wireless, telephone network, internet or the like communication protocols as is known in the art taken alone or in any combination thereof. Optionally and preferably communication channel 118 provides for long range communication between computer 115 and server 104.

Optionally and preferably once at least one and more preferably two communication channels are established data synchronization may be initiated. Optionally and preferably data synchronization may be performed between at least two data stores associated with at least two of mobile device 102, server 104 or computer 115. Most preferably data may be shared between the different devices and stored in different formats specific to each of the devices and applications where synchronization is performed. For example, mobile device 102 and server 104 save contact details using file format A while computer 115 stores contact details using file format B most preferably synchronization process provides for converting in between the various formats, for example A to B to A or the like, as is necessary to ensure complete data synchronization and data integrity.

Optionally data synchronization may be performed in at least one or more methods for example online (synchronous) or offline (asynchronous) configurations. Most preferably, the method utilized for synchronization is determined communication channels established; optionally online synchronization is performed when at least two communication channels 117 and 118 are established; optionally offline synchronization is performed where at least one of communication channels 117 or 118 is established.

Most preferably online synchronization is performed when both communication channels 117 and 118 are established and functioning. Optionally and preferably online synchronization is facilitated by a sync application associated with computer 115. Optionally and preferably sync application (not shown here see FIGS. 3-4) enables computer 115 to act as a proxy between mobile device 102 and server 104, in both directions. Optionally computer sync application enables computer 115 to store a copy of the synchronized and/or transferred data.

Online synchronization may optionally be initiated by agent 108 where data stored on mobile device 102 is read to identify data changes for example, data modified, added and/or deleted in mobile device 102 since the last synchronization was performed. Optionally, any changes to the data may be performed by at least one or more methods for data comparison as is known in the art for example including but not limited to checksum and/or timestamp comparison or the like as is known in the art. Next, once changes are identified they are communicated to computer 115 through communication channel 117. Optionally, a sync application on computer 115 may store the transmitted data from mobile device 102. Next, computer 115 transmits the mobile device changed data to server 104 through communication channel 118. Next, server 104 identifies data changes for example, modified, added and/or deleted data associated with server 104 since the last synchronization was performed, and communicates data changes to computer 115 through communication channels 118. Next, computer 115 communicates the server 104 changed data to mobile device 102 for writing. Optionally computer 115 may store the communicated data received from server 104. Finally, computer 115 provides server 104 with mapping data from mobile device 102, for example one or more local identifiers associated with mobile device 102 are associated with global identifiers associated with server 104. Various synchronization procedures feature such a mapping or association step, for example (and without limitation) as described in U.S. patent application Ser. No. 12/216,810, filed 10 Jul. 2008 and owned in common with the present application, which is hereby incorporated by reference as if fully set forth herein.

Offline synchronization provides for synchronization that may be performed in a stepwise manner comprising at least a two-phase process where at least one communication channels 117 or 118 is established. A first phase comprises established at least one of communication channels 117 or 118 to allow for synchronization between mobile device 102 or server 104 to synchronize with computer 115. Preferably in the second phase of synchronization between computer 115 and mobile device 102 or server 104 is performed depending on which device was not synchronized in the first synchronization phase. Most preferably during the first phase computer 115 acts as a server while synchronizing with mobile device 102 while in the second phase computer 115 acts as a client while synchronizing with server 104. Optionally a third phase may be provided for accommodating an additional synchronization stage, which may be required due to secondary or downstream changes that occur as a result of the original synchronization process, in order to at least check for consistency between computer 115 and mobile device 102 and/or server 104, and optionally and preferably to also re-synchronize data where necessary.

Optionally during the first phase of offline synchronization computer 115 may store synchronized data from the source device (mobile device 102 or sever 104) locally, in local data stores, formats and or applications associated with computer 115, for example a local calendar comprising contact details, tasks such as Microsoft Outlook®, or store other data types in local folders part of computer 115 file system for example "My Pictures" or "My Documents" or "My Music" or the like. During a second phase of offline synchronization the synchronized data is converted to the appropriate data stores and format of the target device (mobile device 102 or server 104, the opposite of that of phase one).

FIG. 1A depicts the first optional embodiment of the present invention showing system 100 wherein agent 108 is associated with mobile device 102. As described above most preferably agent 108 facilitates communication and data exchange within system 100.

Optionally and preferably agent 108 communicates with computer 115, through first communication channel 117 provided by an optional short range communication protocols for example including but not limited to a proprietary protocol, OBEX (object exchange) or the like short range communication protocols over Bluetooth, Infrared, serial cable or the like as is known in the art.

Preferably and optionally mobile device 102 comprises internal memory 112. Optionally memory 112 may provide for internal mobile device 102 functioning and/or applications, for example maintain phone book applications.

Agent 108 preferably facilitates data exchange for example data upload and/or data download, between server 104 and mobile device 102 via computer 115. Optionally agent 108 facilitates data exchange through a cellular/wireless network, for example through a gateway or other bridge (not shown) if computer 115 is not accessible.

Server 104 preferably comprises a database 114 for storing at least one or more data, for example including but not limited to user data, calendar, user settings, phone setting or the like data associated with server 104.

Database 114 may also optionally be used for storing one or more user configuration settings and/or one or more updates. Settings and configuration parameters are stored in database 114 and optionally delivered to agent 108 upon installation and upgrade; optionally, if the user made one or more changes (for example optionally through agent 108) then these change(s) are preferably stored in database 114 for delivery to agent 108. This mechanism is central to achieve a smooth upgrade and to be able to control the settings of multiple devices for the same account. In this manner the user does not have to define his/her settings with each upgrade. The protocol also allows agent 108 to notify server 104 about changes that the user has made to his/her user preferences through the UI of agent 108.

Server application 110 can optionally communicate with other servers in the network (not shown) for transferring data sent from the cellular device 102 to the other servers (not shown), or for transferring data from the other servers (not shown) to the cellular device 102.

FIG. 1B is a schematic block diagram of system 101 according to an optional second embodiment of the present invention wherein agent 108 is associated with computer 115 functioning in the same manner as described above to facilitate data synchronization between server 104 and mobile device 102 in at least one of online or offline synchronization. Optionally and preferably within system 101 agent 108 periodically pulls information from the mobile device 102 optionally and preferably using Bluetooth profiles (forming communication channel 117) for example including but not limited to Generic Object Exchange Profile (GOEP), Synchronization Profile (SYNCH), File Transfer Profile (FTP), or the like as is known in the art.

Figure 2:
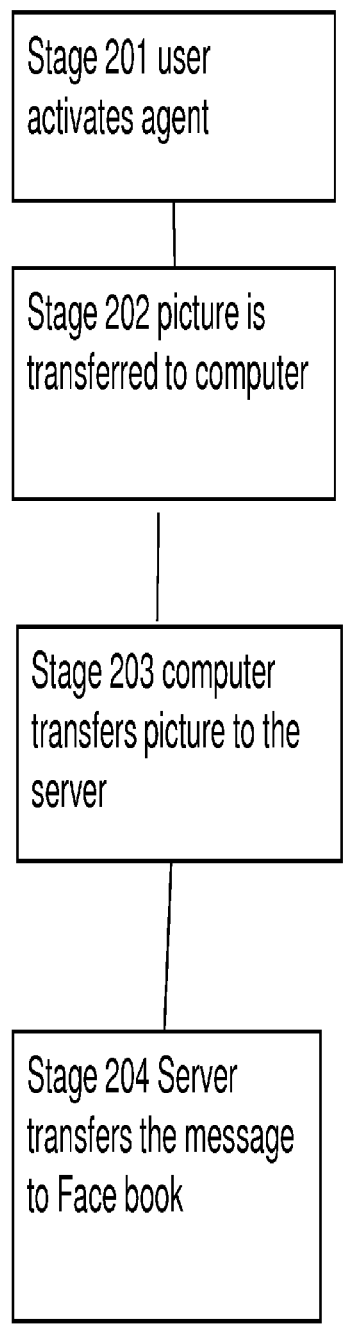
FIG. 2 is a schematic block diagram for transferring data from the cellular device to a content provider server via the computer.

FIG. 2 is a schematic block diagram for an exemplary scenario for transferring data from mobile device 102 to a content provider server 104 via computer 115 as described in FIG. 1A where a user wishes to transfer content, for example an image from mobile device 102 to a website. In stage 201 the user manually activates agent 108, as previously described, optionally through a menu option in mobile device 102. Optionally and preferably agent activation comprises a user providing instructions and/or commands to agent 108 through the User Interface of agent 108, which is optionally and preferably displayed on the screen of device 102. For example, such user setting, instructions and/or commands optionally include selection of the image, the final destination of the image as well as information relating to and/or associated with the image to be transferred for example a caption or short image description. Most preferably user settings, for example including but not limited to file destination, are preferably defined through a Web interface that may optionally and preferably, be provided by server 104. The user may preferably manage these settings, such as selecting destination sites and provide credentials or authorization from computer 115 and/or device 102 preferably through a Web browser. Optionally, settings may be managed through the user interface associated with agent 108. Next in stage 202 agent 108 associated with mobile device 102 (as in FIG. 1A) facilitates image transfer to computer 115 preferably through a local communication channel 117 for example Bluetooth. Next, in stage 203, computer 115 transfers the image to content server 104 preferably using long range communication channel 118 for example the internet via HTTP protocol, over TCP/IP. Finally in stage 204 image content server 104 transfers the image content to the final destination, as defined by the user in stage 201.

Figure 3B:
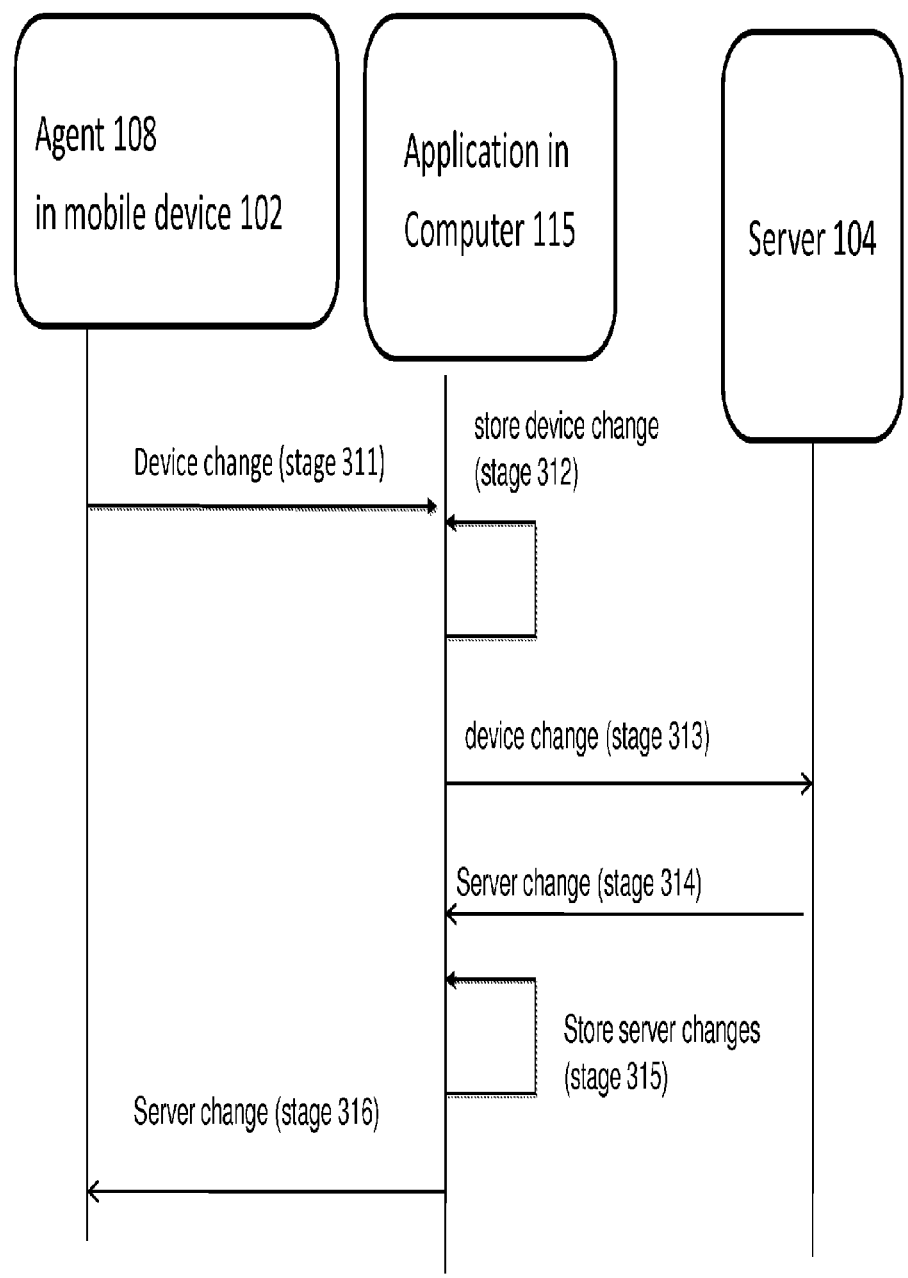
FIG. 3B is a schematic diagram describing the push scenario in offline mode.

FIGS. 3A and 3B are schematic diagrams describing the push scenarios associated with the data transfer and synchronization according to the present invention between a mobile device 102, acting as the data sender, and a computer 115 acting as the data receiver. According to an optional embodiment of the present invention, data transferred from mobile device 102 to computer 115 as previously described may be either pushed or pulled. Most preferably during data push agent 108 that is optionally and preferably associated with mobile device 102, periodically or upon request, transfers data from mobile device 102 to computer 115.

FIG. 3A describes a push synchronization scenario that may take place with a first optional embodiment of the present invention as depicted in FIG. 1A relating to system 100 where data is transferred online (synchronously) between mobile device 102 and server 104 through bridge in the form of computer 115. Synchronized transfer is preferably used when the computer 115 is connected to the server 104 and to the device 102 at the time of the data transfer as described with respect to online synchronization system above. In stage 301, agent 108 facilitates data synchronization between mobile device 102 and computer 115. As previously described agent 108 activation may be provided by at least one or more methods for example including but not limited to manual activation, server activation, or event based activation; for example agent 108 may be activated either periodically, or upon a request from the user. In stage 302, data is transmitted from the computer 115 to the server 104, preferably through communication channel 118. Next in stage 303, server 104 stores the data in an internal storage 114 for example an internal database. Next in stage 304, server 104 transfers data back to computer 115. Finally, in stage 5 updated new data is transferred to device 102 through computer 115.

FIG. 3B describes a scenario in which the data is transferred offline (asynchronously) in two phases. A -synchronized transferred is preferably used when the computer 115 is temporary not connected to at least one of server 104, or mobile device 102 or when only one communication channel 117 or 118 is available when attempting to transfer the data. First in stage 311 data residing in mobile device 102 is communicated to computer 115 over local communication channel 117. Optionally, stage 311 may be performed either periodically, or upon a request from the user. Next in stage 312, data originating from mobile device 102 is stored locally in computer 115. Optionally, the data provided in a format specific to mobile device 102 may be converted to data specific to computer 115 for local storage. Optionally and preferably stages 311 and 312 form the first phase of offline or asynchronous data exchange while stages 313 and 314 form the second phase of offline synchronization. Next in stage 313 is preferably communication channels 118 is established optionally and preferably between computer 115 and server 104 providing for data transfer between computer 115 and server 104 for data transferred to computer 115 during stage 311 from mobile device 102 as described above. Next in stage 314, server 104 optionally and preferably transfers data targeted for device 102 to computer 115, optionally data also remains stored at the server. Next in stage 315 the device 102 targeted data from server 104 is optionally stored in computer 115. Optionally server data is provided in a format specific to server and/or mobile device 102 may be converted to data specific to computer 115 for local storage. Next in stage 316 offline synchronization is completed when data originating from server 104 data reaches its final destination mobile device 102 most preferably once short range and/or local communication channels 117 is established between computer 115 and device 102.

Figure 4A:
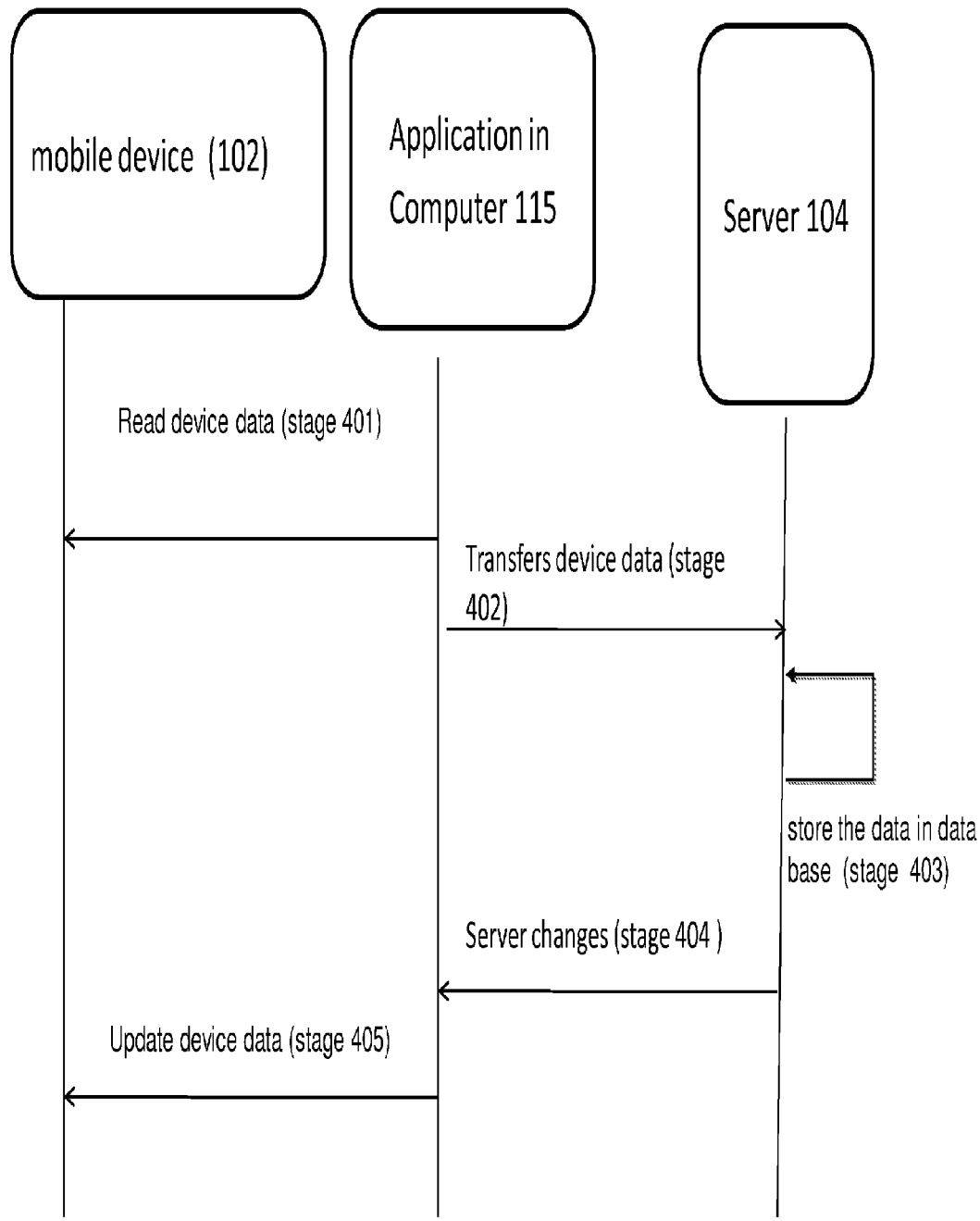
FIG. 4A is a schematic diagram describing the pull scenario in online mode.
Figure 4B:
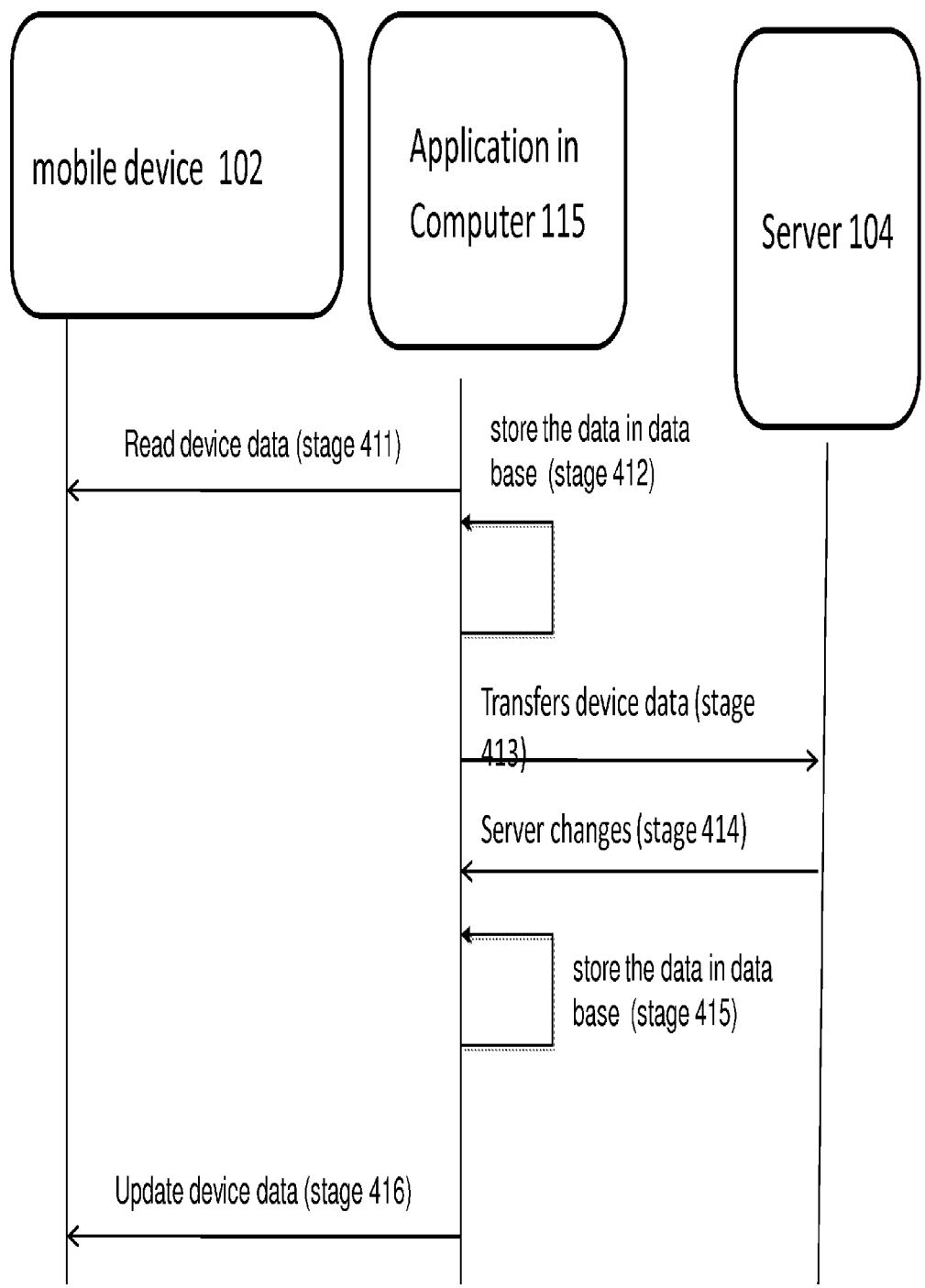
FIG. 4B is a schematic diagram describing the pull scenario in offline mode.

FIGS. 4A-B provide schematic diagrams describing the data pull scenario both with online synchronization, FIG. 4A, and offline synchronization, FIG. 4B, according to optional, illustrative, exemplary embodiments according to the present invention. According to an optional embodiment of the present invention data pulling may be provided with mobile device 102 optionally with or without an agent 108. Optionally if mobile device 102 is not equipped with, and/or associated with and/or available to agent 108, data synchronization according to optional embodiments of the present invention may be provided for with a built-in Bluetooth agent provided with mobile device 102 that optionally implements one or more standard Bluetooth profiles. Optionally, such a Bluetooth profile allows server 104 to access data associated with mobile device 102 for example including but not limited to an address book, files, or the like. Optionally data pulling by computer 115 may provide for access to specific data types otherwise not accessible by agent 108, for example including but not limited to message inbox and/or system files, or the like.

FIG. 4A depicts an example of data pull synchronous or online data transfer scenario between mobile device 102 and content computer 115. Online synchronized data transferred is preferably provided when computer 115 is actively connected to the server 104 and to mobile device essentially simultaneously through at least one and most preferably two communication channels 117 and 118 during data transfer. First in stage 401, application associated with computer 115 reads the data from mobile device 102. Optionally and preferably stage 401 is performed periodically. Next, in stage 402 computer 115 transfers data to server 104. Next in stage 403 data is stored in server 104. Independently to stages 401-403, server 104 may optionally transfer data to mobile device 102. In stage 404, server 104 optionally and preferably transfers data to computer 115. Next in stage 405 data is optionally and preferably transferred to mobile device 102. In addition data is optionally stored in computer 115, preferably at least temporarily.

FIG. 4B describes a scenario in which the data is pulled in an offline or asynchronously data transfer. Asynchronous transfer is optionally and preferably used when computer 115 is temporary not connected to the server 104, or to the device 102, at the time attempting to transfer the data. First in stage 411, the application on the computer 115 reads the data from device 102. Optionally stage 411 is preferably performed periodically. Next in stage 412 the transferred data is stored in computer 115. Next in stage 413 optionally performed when computer 102 is re-connected to server 104, data is transferred to the server 104, optionally a copy of the transferred data is maintained in computer 115. Independently to stages 411-413, server 104 may optionally transfer data to device 102. In stage 414, server 104 optionally and preferably transfers data to computer 115. Next in stage 415 the data is optionally stored in computer 115, at least temporarily until computer 115 is reconnected with the mobile device 102. Next in stage 416, optionally and preferably performed when computer 115 is re-connected to mobile device 102, the data is preferably transferred directly to device 102.

Figure 5:
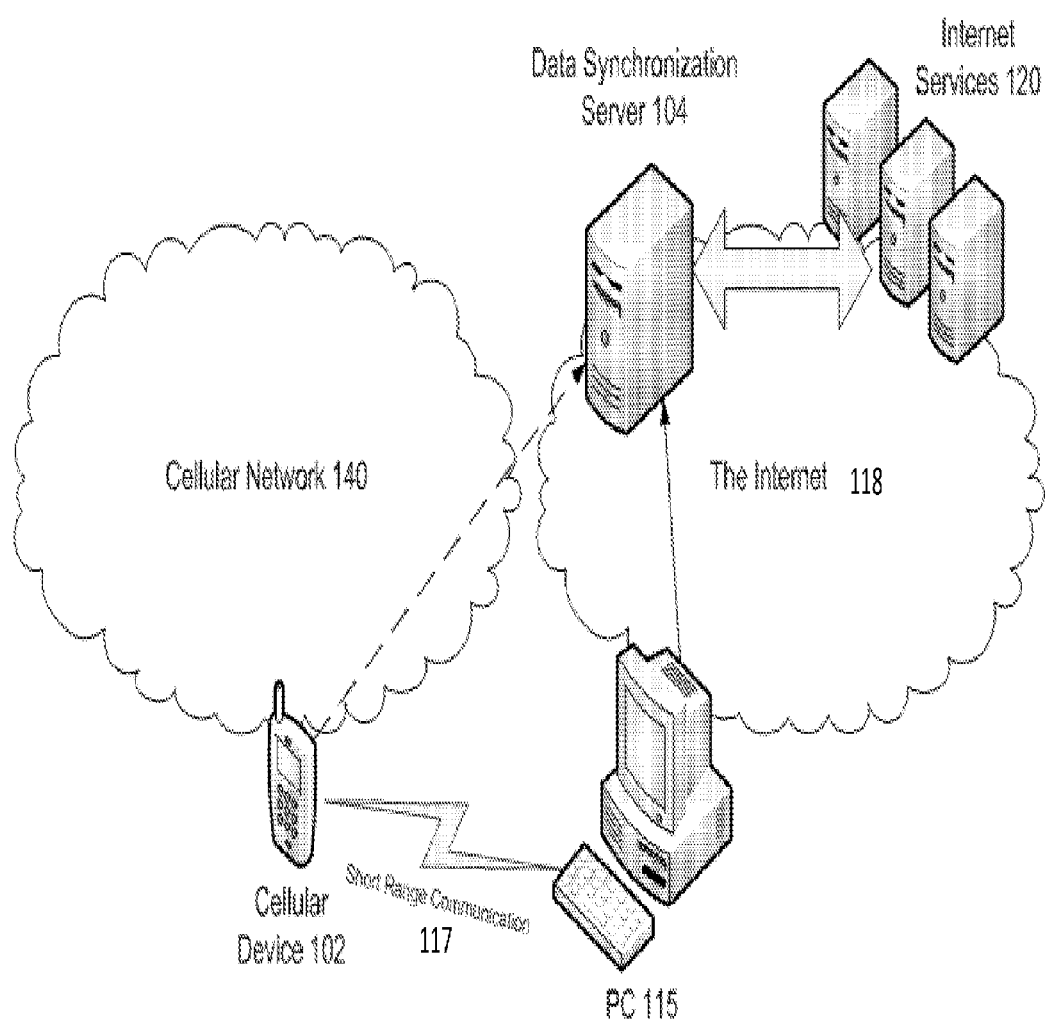
FIG. 5 is a schematic diagram describing the connections in the system.

FIG. 5 is a schematic diagram showing a further depiction of an optional system according to the present invention as shown in FIGS. 1A-B.

State of the art applications show data transfer between a mobile device 102, for example a mobile telephone, data synchronization server 104 via a direct cellular and/or wireless network communication channel 140. However, communication channel 140 is expensive, non-reliable and may provide low bandwidth for data transfer applications between a mobile device 102 and server 104. Alternatively, fixed network communication channels for example in the form of a computer network do not suffer from such downfalls. According to an optional embodiment of the present invention, data is first transferred from mobile device 102 to a computer 115 via a short range communication channels 117, such as Bluetooth, for example and from computer 115 to data synchronization server 104 via long range communication channels and protocols 118, for example provided with a fixed internet connection over DSL, Cables, Ethernet or other computer network 118. Communication channel 118 may optionally further provide for data exchange with auxiliary or third party network servers 120 such as websites in the public for example Facebook, YouTube, or private domain for example bank accounts.

Agent 108 preferably facilitates data exchange for example data upload and/or data download, between server 104 and mobile device 102 via computer 115. Optionally agent 108 may facilitate data exchange through a cellular/wireless network 140 if computer 115 is not accessible. Optionally network communication channel 140 may be further provided with network-level gateways.

FIG. 6 provides a detailed description of an optional proxy authentication process for authenticating both a user and mobile device 102. Most preferably authentication is provided when agent 108 communicates with server 104 indirectly via computer 115, according to an optional embodiment of the present invention wherein a computer application running on computer 115 serves as a proxy most preferably passing all data to server 104. Preferably proxy authentication provides for server 104 to detect new devices and/or hardware changes associated with mobile device 102, for example a SIM card replacement or changes, therein most preferably preventing fraud and/or errors. Without wishing to be limited in any way, proxy authentication is optionally initiated in stage 601 with mobile device 102 authentication is provided for example provided by authenticating device related data, MSISDN data (if available), Bluetooth address data, IMSI, IMEI (GSM) or ESN (CDMA) or the like data associated with the mobile device 102. Optionally server 104 may allocate a unique Device ID during the detection of a new device instance and use that for authentication. Optionally, a private key can be used for applying a challenge-response mechanism for stronger authentication.

Next in stage 602 user authentication of mobile device 102 is provided, for example by using username and password for user verification. Optionally, user authentication may be provided in at least one or more of a plurality of methods as is known in the art for example MSISDN provided by the network, user key that is provisioned upon activation. Following user and device authentication in stages 601 and 602, next in stage 603, agent 108 provides server 104 with the authentication data most preferably along with the encrypted data, for example encrypted by MD5 or the like protocol. Finally in stage 604 server 104 authenticates the data and user information optionally if the data is authenticated then a session identifier is provided by server 104.

FIG. 7 provides is a detailed description of an optional authentication process undertaken between computer 115 and server 104 according to the present invention. Preferably computer 115 and server 104 authentication is provided in a synchronization session which does not involve agent 108. Optionally and preferably an application running on computer 115 facilitates user authentication between computer 115 and server 104.

In stage 701 user configures user authentication details, for example username and password, through an application running on computer 115. Next in stage 702 application 105 saves the authentication credentials. Next in stage 703 when mobile device 102 activates a new session with the server 104, for example for transferring new data, then server 104 authenticates the session via the user authentication data provided through a computer application running on computer 115.

Figure 8:
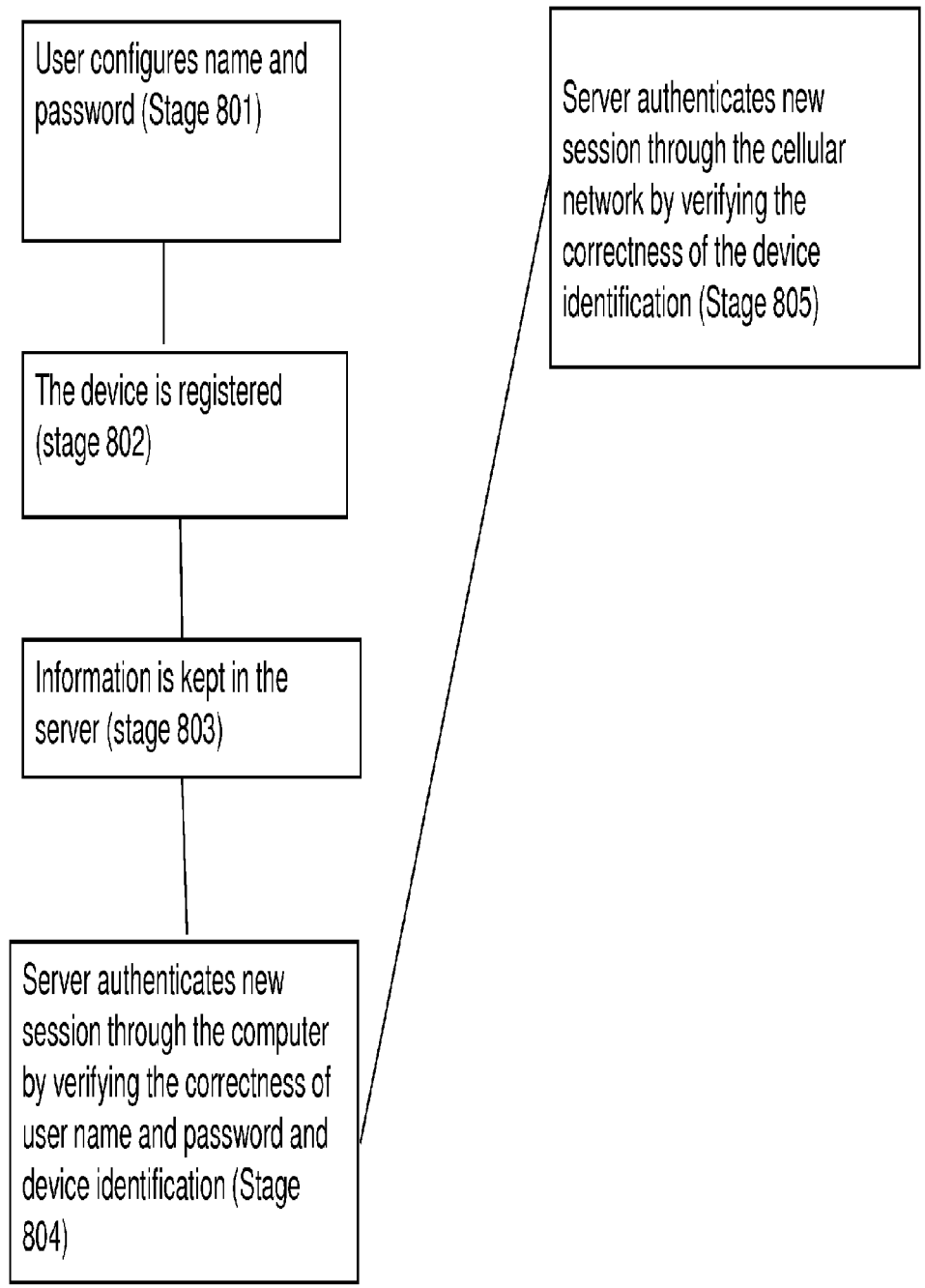
FIG.8 is a detailed description of the double authentication.

FIG. 8 provides an optional method according to the present invention for double authentication process. This mode is preferably used when the connection to the user can be done either through computer 115 or through the cellular network. In this mode, the computer application preferably running on computer 115 is authenticated as a specific user in the server 104, with a username and password. The server 104 is also aware of the device 102 and it is assumed that the device is already provisioned in the system. When connecting to the server 104, the computer application preferably sends user credentials, and more preferably also sends the identification of the device (Bluetooth address, private key, IMEI or other unique ID). The server 104 preferably verifies that device 102 indeed belongs to the user (i.e. the device was provisioned for that specific user) and will allow to synchronize with the user's account only if there is a match.

In stage 801, the user preferably initially provides a username and password through the application in the computer, most preferably when activating the application (one time). Next in stage 802, the device is registered in the system and provisioned to a specific user, preferably through the application that is installed in the computer 115. Next in stage 803 the registration information is kept on server 104. Next in stage 804, when mobile device 102 activates a new data transfer session with server 104 via a computer application running on computer 115, for example, for transferring new data, server 104 authenticates the session using at least two authentications, a first authentication from computer 115 via a computer application, for example by requesting user authentication data for example including username, password, questions, captcha, or the like; and a second authentication from mobile device 102 information. Next in stage 805, when mobile device 102 activates a new session with server 104 via the cellular network, for example for transferring new data, then the server 104 optionally and preferably also authenticates the session via the agent by requesting information, including but not limited to MSISDN, user name/password, private key and so forth.

While the invention has been described with respect to a limited number of embodiments, it will be appreciated that many variations, modifications and other applications of the invention may be made.

What is claimed is:

1. A method, comprising:
receiving digital content at a server, from a computer, utilizing a long range communication channel, the digital content being digital content transmitted from a mobile device to the computer directly utilizing a local network without transmission through a mobile network;
transferring the digital content from the server to a final destination, where the final destination as well as authorization for the transferring is provided from the computer by a user utilizing an interface provided by the server;
authenticating a computer application running on the computer with a username and password at the server, and authenticating information from the mobile device at the server, wherein the authentication of the computer application involves an identification of the mobile device which includes one or more of a Bluetooth address, a private key, and an IMEI; and
receiving credentials of the user at the server for verification.

2. The method of claim 1, wherein the connection between the mobile device and the computer is wireless.

3. The method of claim 2, wherein the wireless connection is Bluetooth or Infrared.

4. The method of claim 2, wherein the wireless connection comprises Wi-Fi or Wi-MAX.

5. The method of claim 1, wherein the connection between the mobile device and the computer is wired.

6. The method of claim 5, wherein the wired connection is a USB cable.

7. The method of claim 1, wherein the connection between the computer and the server is over HTTP.

8. The method of claim 1, wherein the digital content from the mobile device is pushed to the computer.

9. The method of claim 1, wherein the digital content from the mobile device is pulled by the computer.

10. The method of claim 1, wherein the digital content is retrieved from the mobile device and is transferred from the server to one or more servers connected to the internet.

11. The method of claim 1, wherein the digital content is saved and can be retrieved by the mobile device.

12. The method of claim 1, wherein the digital content is transferred from one or more servers connected to the internet to the server and from the server to the communication device.

13. The method of claim 1, wherein the mobile device comprises a cellular telephone.

14. A computer program product embodied on a non-transitory computer readable medium, comprising:
computer code for receiving digital content at a server, from a computer, utilizing a long range communication channel, the digital content being digital content transmitted from a mobile device to the computer directly utilizing a local network without transmission through a mobile network;
computer code for transferring the digital content from the server to a final destination, where the final destination as well as authorization for the transferring is provided from the computer by a user utilizing an interface provided by the server;

computer code for authenticating a computer application running on the computer with a username and password at the server, and authenticating information from the mobile device at the server, wherein the authentication of the computer application involves an identification of the mobile device which includes one or more of a Bluetooth address, a private key, and an IMEI; and computer code for receiving credentials of the user at the server for verification.

15. The computer program product of claim 14, wherein the computer program product is operable such that the connection between the mobile device and the computer is wireless.

16. The computer program product of claim 15, wherein the computer program product is operable such that the wireless connection is Bluetooth or Infrared.

17. The computer program product of claim 15, wherein the computer program product is operable such that the wireless connection comprises Wi-Fi or Wi-MAX.

18. The computer program product of claim 14, wherein the computer program product is operable such that the connection between the mobile device and the computer is wired.

19. The computer program product of claim 14, wherein the computer program product is operable such that the wired connection is a USB cable.

20. A system comprising:

a memory system; and one or more processing cores coupled to the memory system and that are each configured to:

receive digital content at a server, from a computer, utilizing a long range communication channel, the digital content being digital content transmitted from a mobile device to the computer directly utilizing a local network without transmission through a mobile network;

transfer the digital content from the server to a final destination, where the final destination as well as authorization for the transferring is provided from the computer by a user utilizing an interface provided by the server;

authenticate a computer application running on the computer with a username and password at the server, and authenticating information from the mobile device at the server, wherein the authentication of the computer application involves an identification of the mobile device which includes one or more of a Bluetooth address, a private key, and an IMEI; and receive credentials of the user at the server for verification.

* * * * *